(12) United States Patent
Kim et al.

(10) Patent No.: US 11,689,237 B2
(45) Date of Patent: Jun. 27, 2023

(54) ACCESSORY FOR ELECTRONIC DEVICE

(71) Applicants: Ye Seul Kim, Seoul (KR); Song Hee Kim, Seoul (KR); Ji Hun Kim, Ulsan (KR)

(72) Inventors: Ye Seul Kim, Seoul (KR); Song Hee Kim, Seoul (KR); Ji Hun Kim, Ulsan (KR)

(*) Notice: Subject to any disclaimer, the term of this patent is extended or adjusted under 35 U.S.C. 154(b) by 0 days.

(21) Appl. No.: 17/532,081

(22) Filed: Nov. 22, 2021

(65) Prior Publication Data

US 2022/0166455 A1  May 26, 2022

(30) Foreign Application Priority Data

Nov. 24, 2020  (KR) .................. 10-2020-0159236

(51) Int. Cl.
*H04B 1/3877* (2015.01)
*H04M 1/04* (2006.01)
(Continued)

(52) U.S. Cl.
CPC .......... *H04B 1/3877* (2013.01); *H04M 1/026* (2013.01); *H04M 1/04* (2013.01); *H04M 1/21* (2013.01)

(58) Field of Classification Search
CPC ...... H04B 1/3877; H04M 1/026; H04M 1/04; H04M 1/21
See application file for complete search history.

(56) References Cited

U.S. PATENT DOCUMENTS

| 8,560,031 B2* | 10/2013 | Barnett | .................. F16M 11/40 |
| | | | 455/575.8 |
| 8,737,066 B1* | 5/2014 | Block | ...................... A45F 5/00 |
| | | | 224/217 |

(Continued)

FOREIGN PATENT DOCUMENTS

| KR | 20170127153 A | 11/2017 |
| KR | 1020170127153 A | 11/2017 |

(Continued)

OTHER PUBLICATIONS

Decision to Grant of Patent dated Sep. 1, 2021 (Application No. 10-2020-0159236).

(Continued)

*Primary Examiner* — Jinsong Hu
*Assistant Examiner* — Rui M Hu
(74) *Attorney, Agent, or Firm* — The Dobrusin Law Firm, PC (57) ABSTRACT

Disclosed is an accessory for an electronic device, which is attached to the rear surface of an electronic device or an electronic device case. A first embodiment includes a cone having an empty space therein, a wrinkle part formed on a body thereof, and an upper portion and a lower portion that are open, an inverted cone having an empty space therein, a wrinkle part formed on a body thereof, an upper portion that is open, and a lower portion having a protrusion extending therefrom, the protrusion being composed of a neck part and a head part, a clamping ring, which is positioned inside the cone and coupled to the neck part of the protrusion in a state in which the protrusion is inserted into an upper opening of the cone, and a neck cylinder for surrounding the neck part of the protrusion.

4 Claims, 9 Drawing Sheets

(51) Int. Cl.
  *H04M 1/02* (2006.01)
  *H04M 1/21* (2006.01)

(56) References Cited

U.S. PATENT DOCUMENTS

| | | | | |
|---|---|---|---|---|
| 9,179,565 | B2* | 11/2015 | Cho | G06F 1/163 |
| 9,647,714 | B2* | 5/2017 | Hirsch | A45F 5/00 |
| 9,804,636 | B2* | 10/2017 | Barnett | G06F 1/1656 |
| 9,958,107 | B1* | 5/2018 | Hobbs | F16M 13/00 |
| 10,244,854 | B1* | 4/2019 | Haber | H04B 1/385 |
| 10,299,553 | B1* | 5/2019 | Hoover | H04B 1/3888 |
| 10,389,860 | B2* | 8/2019 | Nahum | H04M 1/04 |
| 10,463,116 | B2* | 11/2019 | Barnett | F16M 13/04 |
| 10,638,627 | B1* | 4/2020 | Stime | F16M 11/10 |
| 10,694,835 | B2* | 6/2020 | Peterson | A45C 11/00 |
| 10,750,844 | B2* | 8/2020 | Peterson | A45F 5/00 |
| D897,329 | S* | 9/2020 | Peterson | D14/250 |
| 10,800,024 | B2* | 10/2020 | Karmatz | B25G 1/04 |
| 10,897,984 | B2* | 1/2021 | Roth | A45F 5/00 |
| D921,359 | S* | 6/2021 | Roth | D3/218 |
| 11,149,902 | B2* | 10/2021 | Barnett | F16M 13/005 |
| 11,183,880 | B2* | 11/2021 | Haber | H02J 50/10 |
| 2007/0018064 | A1* | 1/2007 | Wang | F16M 13/022 224/42.32 |
| 2012/0118770 | A1* | 5/2012 | Valls | F16M 13/00 248/688 |
| 2014/0360893 | A1* | 12/2014 | Whitten | F16M 11/041 206/37 |
| 2016/0069512 | A1* | 3/2016 | Grieve | A45F 5/00 294/142 |
| 2017/0195000 | A1* | 7/2017 | Srour | H04R 1/1033 |
| 2018/0288204 | A1* | 10/2018 | Nahum | A45F 5/10 |
| 2019/0089822 | A1* | 3/2019 | Gartz | F16M 11/14 |
| 2019/0138052 | A1* | 5/2019 | Barnett | H04B 1/3877 |
| 2019/0211966 | A1* | 7/2019 | Nahum | F16M 13/04 |
| 2019/0215387 | A1* | 7/2019 | Chiang | G06F 1/1656 |
| 2019/0215391 | A1* | 7/2019 | Chiang | F16M 13/00 |
| 2019/0225378 | A1* | 7/2019 | Barnett | A47G 23/0216 |
| 2019/0245960 | A1* | 8/2019 | Nahum | H04M 1/04 |
| 2019/0335031 | A1* | 10/2019 | Nahum | F16M 11/041 |
| 2020/0099779 | A1* | 3/2020 | Lewis | F16M 13/022 |
| 2020/0099829 | A1* | 3/2020 | Lewis | A45F 5/10 |
| 2020/0253362 | A1* | 8/2020 | Ruddy | A45F 5/00 |
| 2021/0123268 | A1* | 4/2021 | Gulick Jr | F16M 13/00 |
| 2021/0124395 | A1* | 4/2021 | Barnett | G06F 1/1686 |
| 2021/0140580 | A1* | 5/2021 | Nahum | A45C 11/00 |
| 2021/0249880 | A1* | 8/2021 | Taylor | H02J 7/02 |
| 2021/0363788 | A1* | 11/2021 | Gulick, Jr | F16M 11/041 |
| 2022/0094379 | A1* | 3/2022 | Balderston | H04M 1/725 |
| 2022/0116491 | A1* | 4/2022 | Chiang | F16M 13/04 |
| 2022/0159113 | A1* | 5/2022 | Parish, Sr. | H04M 1/04 |

FOREIGN PATENT DOCUMENTS

| | | |
|---|---|---|
| KR | 102047407 B1 | 11/2019 |
| KR | 102107797 B1 | 5/2020 |
| KR | 102301971 B1 | 9/2021 |

OTHER PUBLICATIONS

Notification of Reason for Refusal dated Jan. 12, 2021, Application No. 10-2020-0159236).
Notification of Reason for Refusal dated Mar. 25, 2021, Application No. 10-2020-0159236).
Centaur. Centaur Quad Lock to PopSocket Swappable/PopTop adapter. Youtube, Jul. 17, 2019 [Dec. 28, 2021], <URL: https://www.youtube.com/watch?v=XKc0ngWRyZ8>.
International Search Report & Written Opinion for PCT Application No. PCT/KR2021/014115 dated Jan. 17, 2022.

* cited by examiner

ACCESSORY FOR ELECTRONIC DEVICE

CROSS REFERENCE TO RELATED APPLICATION

The present application claims priority to Korean Patent Application No. 10-2020-0159236, filed Nov. 24, 2020 the entire contents of which is incorporated herein for all purposes by this reference.

BACKGROUND

The present disclosure relates to an accessory attached to the back of a portable electronic device, such as a smartphone, a tablet PC, PDF, or the like or an electronic device case.

For example, Korean Patent Publication No. 10-2047407 discloses an accessory attached to the back of a portable electronic device, such as a smartphone, a tablet PC, a PDF, or an electronic device case.

The accessory disclosed in the above-mentioned publication includes a first body formed to be attached to an electronic device or an electronic device case, a first deforming part having one end coupled to the first body and the other end extending and contracting in a telescopic connection form in a first direction so as to be spaced apart from the first body, a second deforming part having one end coupled to the other end of the first deforming part and the other end extending in a telescopic connection form toward the first direction, a second body coupled to the other end of the second deforming part in the form of a plate, and a connecting part formed between the first deforming part and the second deforming part so as to be inserted between the first and second body parts where the first and second deforming parts partially cross each other when the first and second deforming parts are contracted.

However, since the accessory disclosed in the above-mentioned publication has a structure, in which the first deforming part and the second deforming part are individually bonded and adhered to the connecting part in such a manner that the first deforming part is bonded and adhered to one side of the connecting part and the second deforming part is bonded and adhered to the other side of the connecting part, there is a problem that this prior art accessory is not easy to assemble. Furthermore, when this prior art accessory is used for a long period of time, there is a fear that the first deforming part or the second deforming part may be easily separated from the connecting part.

PRIOR ART DOCUMENT

Patent Document

[Patent Document 1] Korean Patent Publication No. 10-2047407 B1, published on Nov. 21, 2019

SUMMARY

The present invention is derived to solve the problems as described above and has an objective to provide an accessory for an electronic device, which is attached to the back of an electronic device or a case of such an electronic device so as to provide a new gripper part to a user and has a function of positioning the electronic device on a place, for example, on top of a desk, wherein the accessory for an electronic device is easy to assemble and has durability.

In order to achieve the above described objective of the present invention, according to one aspect of the present invention, there is provided an accessory for an electronic device, includes: a cone, which has an empty space therein, a wrinkle part formed on a body thereof so as to be folded in a telescopic manner, and an upper portion and a lower portion, which are open; an inverted cone, which has an empty space therein, a wrinkle part formed on a body thereof so as to be folded in a telescopic manner, an upper portion that is open, and a lower portion having a protrusion extending therefrom, the protrusion being composed of a neck part and a head part; a clamping ring, which is positioned inside the cone and coupled to the neck part of the protrusion in a state in which the protrusion is inserted into an upper opening of the cone; and a neck cylinder, which surrounds the neck part of the protrusion.

In addition, the accessory for an electronic device may further include: a first cover for covering a lower opening of the cone; and a second cover for covering an upper opening of the inverted cone.

The first cover may include: a mounting disc, which has a plurality of locking blades provided at regular intervals along the circumference of the mounting disc, and has a lower surface to be attached to a portable electronic device; and a main disc, which has a diameter corresponding to the diameter of the lower opening of the cone and has a receiving part formed on a lower surface thereof so as to accommodate the mounting disc.

The second cover may include: a main disc having a diameter corresponding to the diameter of the upper opening of the inverted cone; and a sub disc detachably attached to the upper surface of the main disc.

According to another aspect of the present invention, there is provided an accessory for an electronic device, includes: a cone, which has an empty space therein, a wrinkle part formed on a body thereof so as to be folded in a telescopic manner, and an upper portion and a lower portion, which are open; an inverted cone, which has an empty space therein, a wrinkle part formed on a body thereof so as to be folded in a telescopic manner, an upper portion that is open, and a lower portion having a protrusion extending therefrom, the protrusion having a screw hole formed in the center of the bottom surface thereof; a ring plate having a diameter larger than that of an upper opening of the cone and added to the bottom surface of the protrusion while the protrusion is inserted into the upper opening of the cone; a screw for fixing the ring plate to the protrusion; and a neck cylinder, which surrounds the protrusion and disposed between the cone and the inverted cone.

The accessory for an electronic device according to the first aspect of the present invention is attached to the back of an electronic device or an electronic device case, provides a new gripper part to a user, and also functions to position the electronic device on a place, for example, on top of a desk.

In addition, the accessory for an electronic device according to the first aspect of the present invention has a structure, in which a cone and an inverted cone are combined with each other by the protrusion of the cone and a clamping ring. Therefore, it is easy to assemble the cone and the inverted cone, and the risk of separation of the cone and the inverted cone from each other is very low even after long-term use.

The accessory for an electronic device according to the second embodiment has a structure, in which a cone and an inverted cone are combined with each other by the protrusion of the cone, a ring plate and a screw. Therefore, it is easy to assemble the cone and the inverted cone, and the risk of separation of the cone and the inverted cone from each other is very low even after long-term use.

DETAILED DESCRIPTION

Hereinafter, an accessory for an electronic device according to a variety of embodiments of the present invention will be described in detail with reference to the accompanying drawings.

Accessory 100 for an Electronic Device According to a First Embodiment

Figure 2:
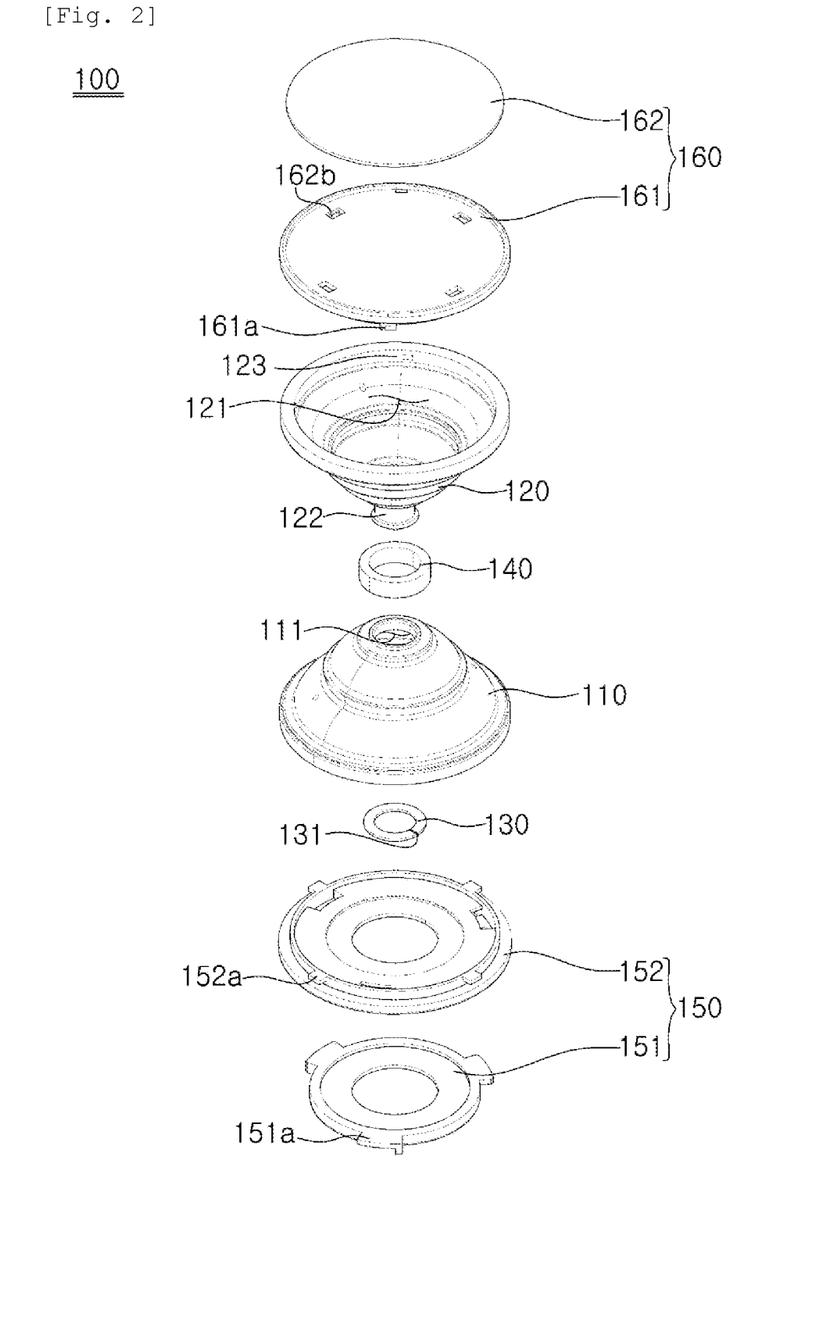
FIG. 2 is an exploded view illustrating the accessory for an electronic device according to the first embodiment shown in FIG. 1.

In explaining an accessory for an electronic device according to a first embodiment, the expression for the direction of each constituent element such as upper, lower, top or bottom is based on FIG. 2.

Figure 1:
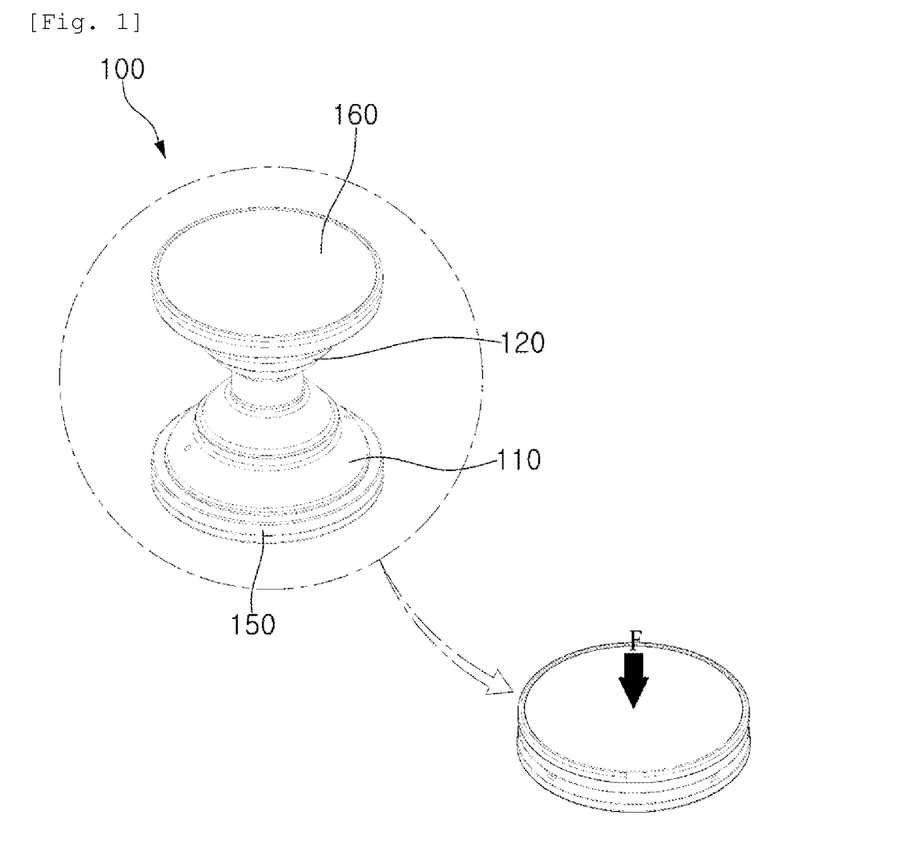
FIG. 1 is a perspective view illustrating an accessory for an electronic device according to a first embodiment of the present invention.

FIG. 1 is a perspective view illustrating an accessory 100 for an electronic device according to a first embodiment of the present invention (hereinafter, referred to as "accessory 100 for an electronic device") and FIG. 2 is an exploded view illustrating the accessory 100 for an electronic device of FIG. 1.

Figure 3:
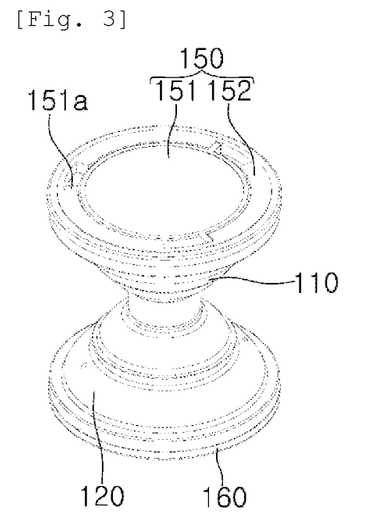
FIG. 3 is a perspective view illustrating the appearance of the accessory for an electronic device according to the first embodiment, shown in an inverted state.
Figure 4:
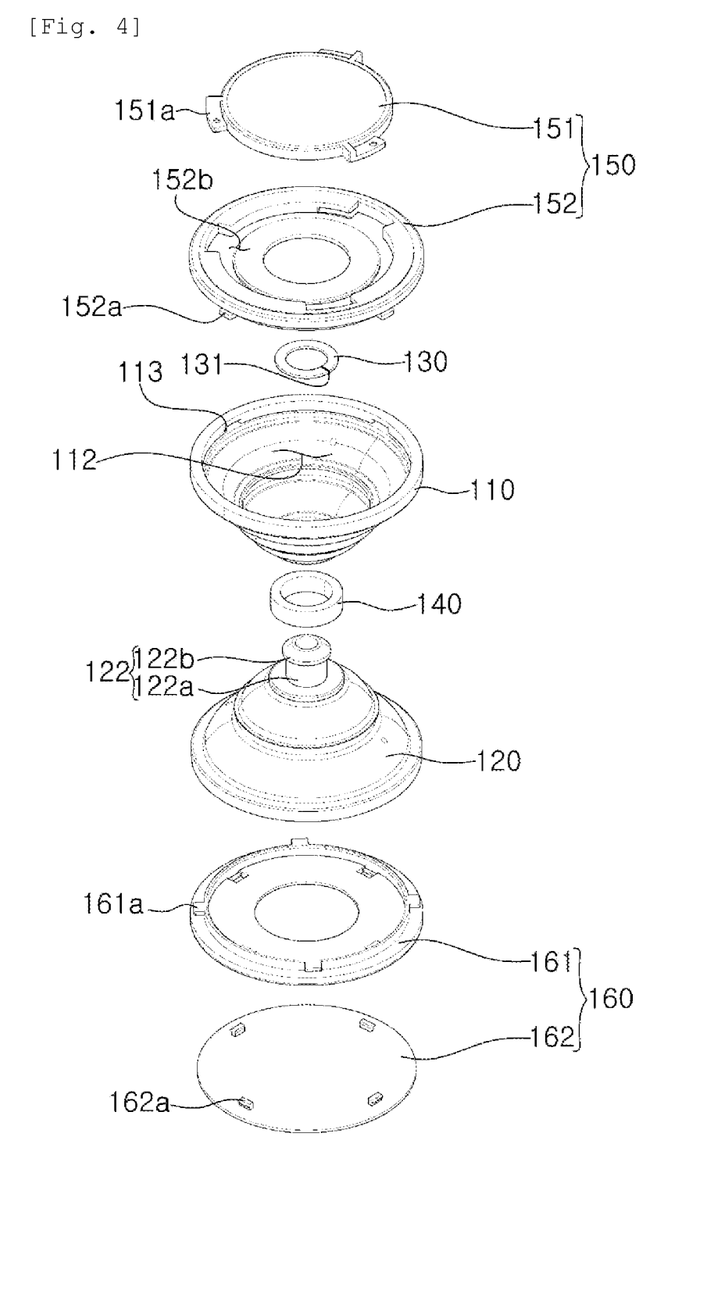
FIG. 4 is an exploded view illustrating the accessory for an electronic device according to the first embodiment, shown in FIG. 3.

Referring to FIG. 1 and FIG. 2 (referring further to FIG. 3 and FIG. 4 as necessary), the accessory 100 for an electronic device includes a cone 110, an inverted cone 120, a clamping ring 130 and a neck cylinder 140, and may further include a first cover 150 and a second cover 160.

The cone 110 has a shape that gradually decreases in diameter in the upward direction. The cone 110 has an empty space formed inside and openings which are formed in the upper and lower portions so as to communicate with the empty space. The opening formed in the upper portion of the cone 110 is called an upper opening 111 and the opening formed in the lower portion is called a lower opening 112. The cone 110 has a wrinkle part formed on the body thereof in the height direction and thus can be telescopically folded.

The inverted cone 120 is positioned directly on the cone 110. The inverted cone 120 has a shape that gradually decreases in diameter in the downward direction. The inverted cone 120 has an empty space therein, an upper portion that is open so as to communicate with the empty space, and a lower portion having a protrusion 122 extending therefrom. The opening formed in the upper portion of the inverted cone 120 is called an upper opening 121. The body of the inverted cone 120 is corrugated along the height direction, so the inverted cone 120 can be telescopically folded.

The protrusion 122 of the inverted cone 120 is in the form of a cylinder with a predetermined height and includes a neck part 122a, of which upper portion is connected to the center of the lower portion of the inverted cone 120, and a head part 122b that is formed in a cone or spherical shape at the lower portion of the neck part 122a. The head part 122b is inserted into the upper opening 111 of cone 110, wherein the diameter of the head part 122b is preferably greater than or equal to the diameter of the upper opening 111 of the cone 110 within a range in which the head part 122b can be forcedly fitted into the upper opening 111 of the cone 110.

Figure 5:
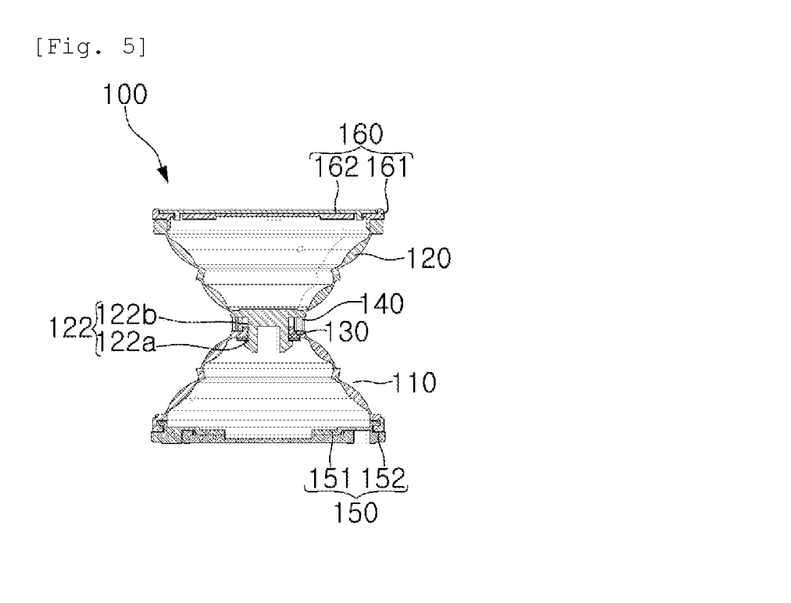
FIG. 5 is a cross-sectional view illustrating the accessory for an electronic device according to the first embodiment.

Referring to FIG. 2 and FIG. 5, the clamping ring 130 is coupled to the neck part 122a of the protrusion 122 in a state, in which the protrusion 122 is inserted into the upper opening 111 of the cone 110, and is positioned inside the cone 110. The clamping ring 130 functions to block the protrusion 122 inserted into the upper opening 111 of the cone 110 from disengaging in the opposite direction to the insertion direction. The clamping ring 130 functions to block the protrusion 122 inserted into the upper opening 111 of the cone 110 from disengaging in the opposite direction to the insertion direction.

The clamping ring 130 is made of a metal material or a synthetic resin material, and may have a break part 131 formed at a point of the clamping ring 130.

The neck cylinder 140 surrounds the neck part 122a of the protrusion 122. The neck cylinder 140 forms a gap between the cone 110 and the inverted cone 120 and functions to limit the pivoting of protrusion 122. In addition, when the protrusion 122 is forcibly pivoted by a strong external force, the neck cylinder 140 presses one side of the cone 110 as a whole so that the one side of the cone 110 can be effectively compressed (contracted).

Referring back to FIG. 1 and FIG. 2 (see FIG. 3 to FIG. 4 as necessary), the first cover 150 is coupled to the cone 110 and covers the lower opening 112 of the cone 110.

The first cover 150 may include a mounting disc 151 and a main disc 152. The main disc 152 has an area corresponding to that of the lower opening 112 of cone 110. The main disc 152 and the cone 110 may be combined in various ways, wherein as an example, as shown in the drawings, hooks 152a (at least two hooks are required) are formed on the upper surface of the main disc 152 and grooves 113 (at least two grooves are required) are formed on the inside of the cone 110 so as to accommodate the aforementioned hooks 152a, so that the main disc 152 may be engaged with the cone 110.

The main disc 152 has a receiving part 152b formed on the lower surface thereof so as to receive the mounting disc 151.

The lower surface of the mounting disc 151 is attached to the rear surface of a portable electronic device or to a case of such an electronic device. The mounting disc 151 is made of a thickness and a material that do not affect wireless charging of the electronic device. The mounting disc 151 has an area relatively smaller than that of the main disc 152 and is provided with locking blades 151a at regular intervals around the mounting disc 151.

When either the mounting disc 151 or the main disc 152 is rotated in place in a state, in which the mounting disc 151 is inserted into the receiving part 152b of the main disc 152, the mounting disc 151 and the main disc 152 are fastened by means of the plurality of locking blades 151.

Figure 6:
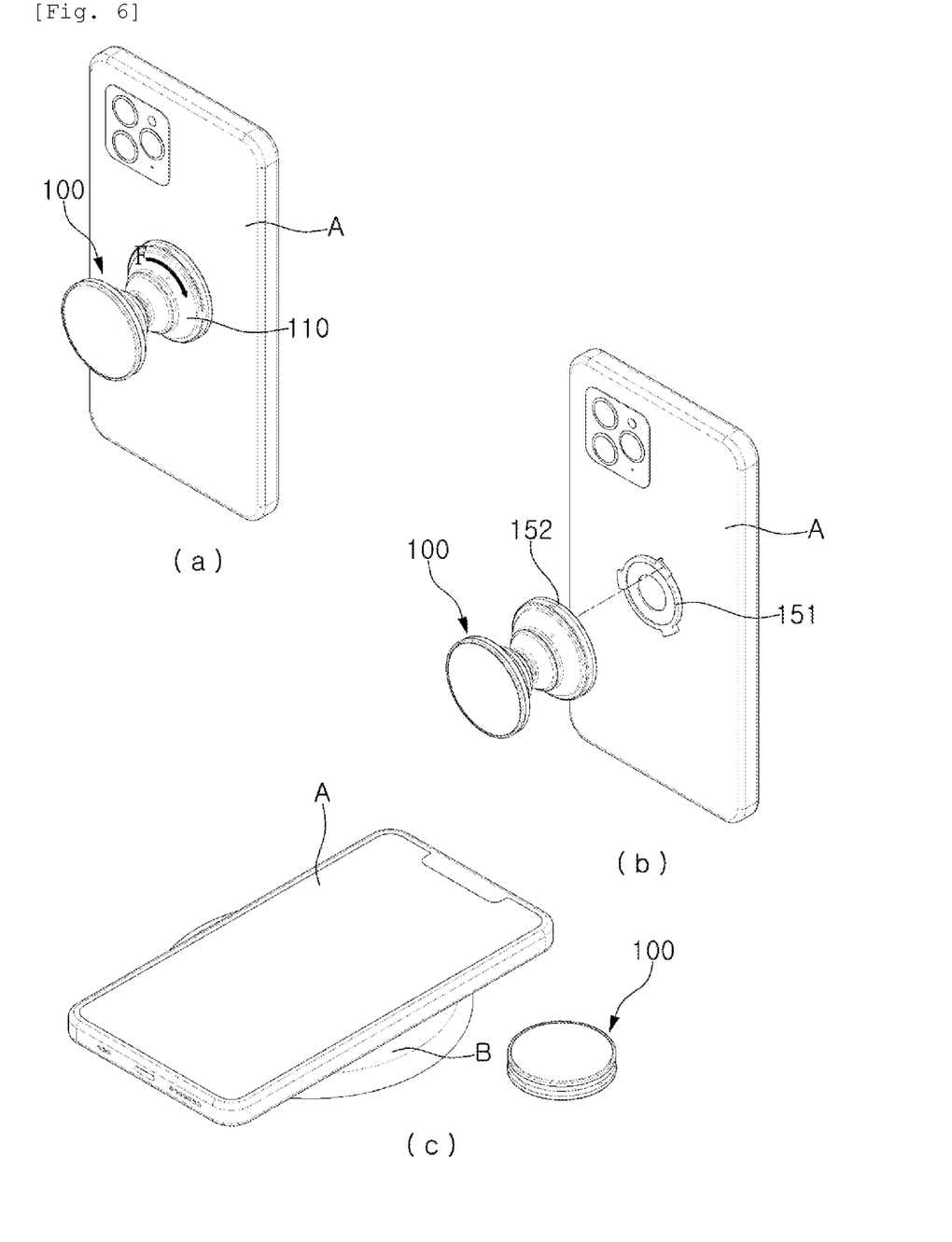
FIG. 6 shows an example of using the accessory for an electronic device according to the first embodiment.

To the contrast, referring to FIG. 6(a) and FIG. 6(b), all other constituent elements of the accessory 100 for an electronic device except for the mounting disc 151 may be integrally separated from a portable electronic device A. Therefore, as shown in FIG. 6(c), if a user easily separates the accessory 100 for an electronic device from the portable electronic device A and places the portable electronic device A on the top of a wireless charger B, then the user can wirelessly charge the portable electronic device A.

Referring back to FIG. 1 and FIG. 2 (see FIG. 3 to FIG. 4 as necessary), the second cover 160 is coupled to the inverted cone 120 and covers the upper opening 121 of the inverted cone 120.

The second cover 160 may include a main disc 161 and a sub disc 162. The main disc 161 has an area corresponding to that of the upper opening 121 of the inverted cone 120. The main disc 161 and the inverted cone 120 may be combined in various ways, wherein as an example, as shown in the drawings, hooks 161a (at least two hooks are required) are formed on the lower surface of the main disc 161 and grooves 123 (at least two grooves are required) are formed on the inside of the inverted cone 120 so as to accommodate the aforementioned hooks 161a, so that the main disc 161 may be engaged with the inverted cone 120.

The sub disc 162 has an area relatively smaller than that of the main disc 161 and is detachably provided on upper surface of the main disc 161. The sub disc 162 has hooks 162a (at least two hooks are required) formed on the lower surface of the sub disc 162, and the main disc 161 has grooves 162b (at least two grooves are required) formed on the upper surface of the main disc 161 so as to accommodate the aforementioned hooks 162a, so that the sub disc 162 may be engaged with the main disc 161. Characters, advertisements, etc. may be displayed on the upper surface of the sub disc 162. In addition, the upper surface of the sub disc 162 may be a mirror.

The accessory 100 for an electronic device described above is attached to the rear surface of an electronic device or an electronic device case, thereby providing a new gripper part to a user and also functioning to position the electronic device on a place, for example, on top of a desk.

In addition, the accessory 100 for an electronic device has a structure, in which the cone 110 and the inverted cone 120 are combined by means of the protrusion 122 of the cone 110 and the clamping ring 130. Therefore, it is easy to assemble the cone 110 and the inverted cone 120, and the risk of separation of the cone 110 and the inverted cone 120 from each other is very low even after long-term use.

In addition, a user of the accessory 100 for an electronic device can easily adjust the angle of the electronic device by distorting any one of the cone 110 and the inverted cone 120. If necessary, the user may easily remove the main part occupying a large volume (for example, the cone 110 or the inverted cone 120) from the electronic device (or the electronic device case) by using the first cover 150.

Accessory 200 for an Electronic Device According to a Second Embodiment

Figure 7:
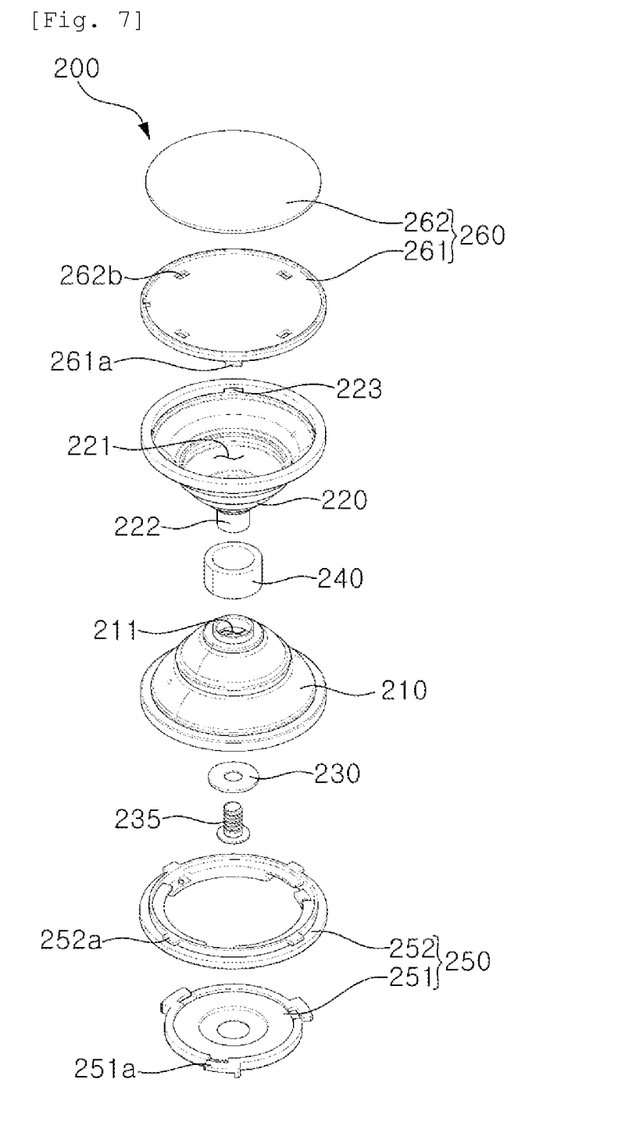
FIG. 7 is an exploded perspective view illustrating an accessory for an electronic device according to a second embodiment of the present invention.

In explaining an accessory for an electronic device according to a second embodiment, the expression for the direction of each constituent element such as upper, lower, top or bottom is based on FIG. 7.

Figure 8:
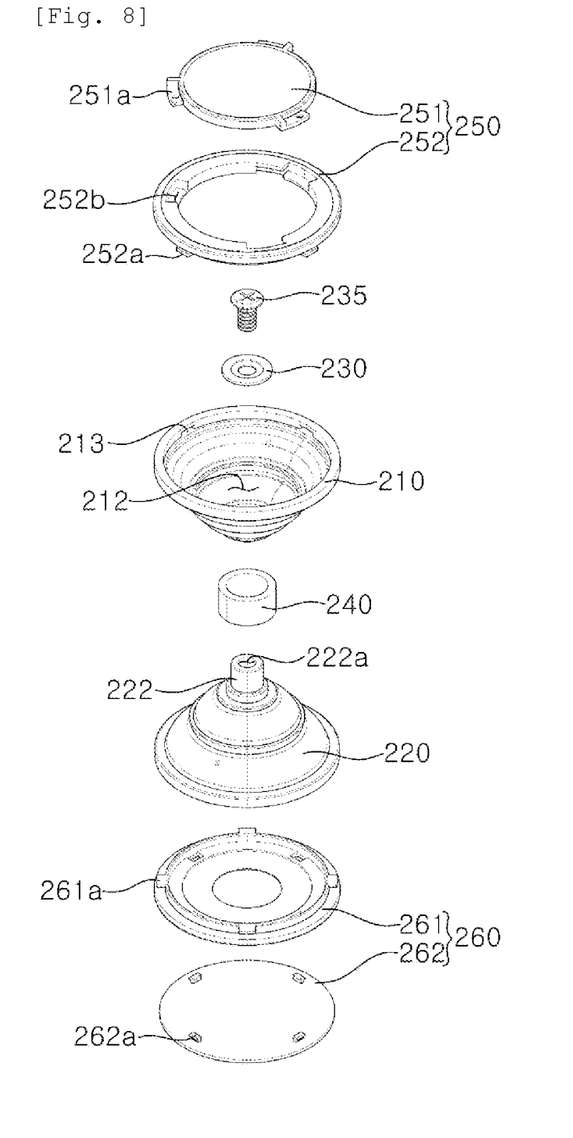
FIG. 8 is an exploded perspective view illustrating the accessory for an electronic device according to a second embodiment of the present invention, shown in a vertically inverted state.
Figure 9:
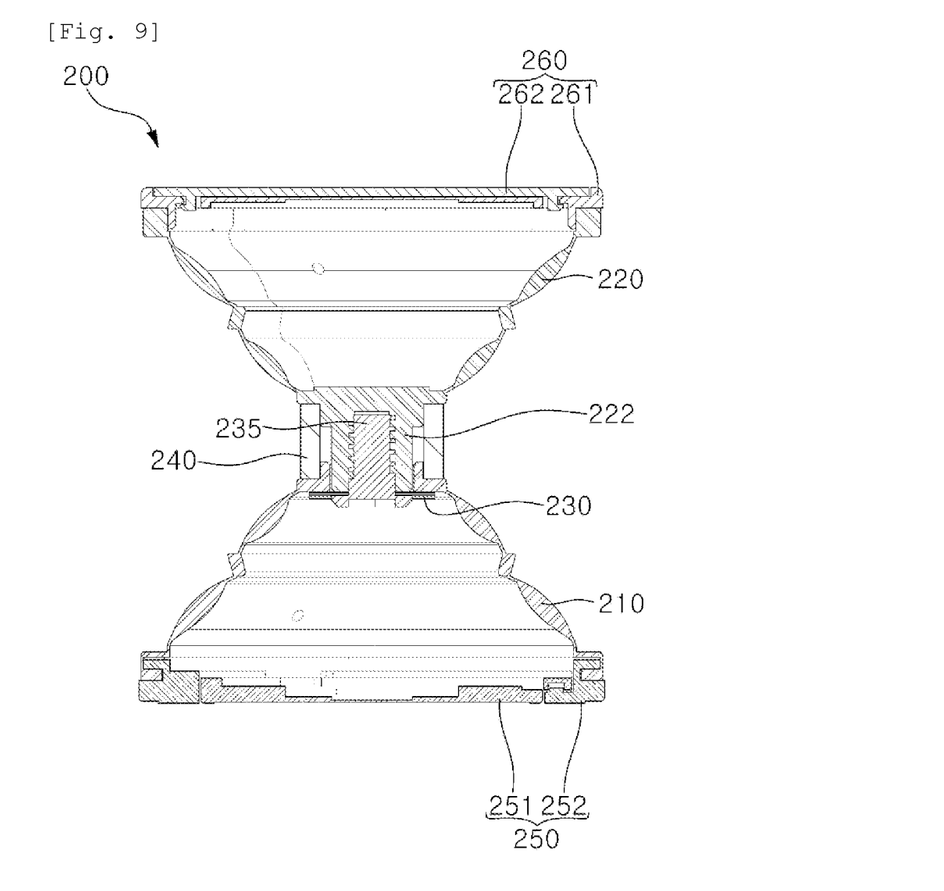
FIG. 9 is a cross-sectional view illustrating the accessory for an electronic device according to the second embodiment.

FIG. 7 is an exploded perspective view illustrating an accessory 200 for an electronic device according to a second embodiment of the present invention (hereinafter, referred to as "accessory 200 for an electronic device"), FIG. 8 illustrates a vertically inverted state of the accessory for an electronic device of FIG. 7, and FIG. 9 illustrates a cross-sectional view of the accessory 200 for an electronic device.

As shown in FIG. 7 to FIG. 9, the accessory 200 for an electronic device may include a cone 210, an inverted cone 220, a ring plate 230, a screw 235, and a neck cylinder 240, and may further include a first cover 250 and a second cover 260.

The cone 210 has a shape that gradually decreases in diameter in the upward direction. The cone 210 has an empty space formed inside and openings which are formed in the upper and lower portions so as to communicate with the empty space. The opening formed in the upper portion of the cone 210 is called an upper opening 211 and the opening formed in the lower portion is called a lower opening 212. The cone 210 has a wrinkle part formed on the body thereof in the height direction and thus the cone 210 can be telescopically folded.

The inverted cone 220 is positioned directly on the cone 210. The inverted cone 220 has a shape that gradually decreases in diameter in the downward direction. The inverted cone 220 has an empty space therein, an upper portion that is open so as to communicate with the empty space, and a lower portion having a protrusion 222 extending therefrom. The opening formed in the upper portion of the inverted cone 220 is called an upper opening 221. The body of the inverted cone 220 is corrugated along the height direction, so the inverted cone 220 can be telescopically folded.

The protrusion 222 of the inverted cone 220 has a predetermined height and has a diameter corresponding to that of the upper opening 211 of the cone 210. The protrusion 222 has a screw hole 222a formed in the center of the bottom surface of the protrusion 222.

The ring plate 230 is added to the bottom surface of the protrusion 222 while the protrusion 222 is inserted into the upper opening 211 of the cone 210 and is positioned inside the cone 210. The ring plate 230 has a diameter larger than that of the upper opening 211 of cone 210.

The screw 235 is fastened to the screw hole 222a of the protrusion 222 so as to fix the ring plate 230 to the protrusion 222.

The ring plate 230 functions to prevent the protrusion 222 inserted into the upper opening 211 of the cone 210 from being separated in the opposite direction to the insertion direction.

The clamping ring 230 is made of a metal material or a synthetic resin material.

The neck cylinder 240 surrounds the protrusion 122. The neck cylinder 240 forms a gap between the cone 210 and the inverted cone 220 and functions to limit the pivoting of protrusion 222. In addition, when the protrusion 222 is forcibly pivoted by a strong external force, the neck cylinder 240 presses one side of the cone 210 as a whole so that the one side of the cone 210 can be effectively compressed (contracted).

The first cover 250 is coupled to the cone 210 and covers the lower opening 212 of the cone 210.

The first cover 250 may include a mounting disc 251 and a main disc 252. The main disc 252 has an area corresponding to that of the lower opening 212 of cone 210. The main disc 252 and the cone 210 may be combined in various ways, wherein as an example, as shown in the drawings, hooks 252a (at least two hooks are required) are formed on the upper surface of the main disc 252 and grooves 213 (at least two grooves are required) are formed on the inside of the cone 210 so as to accommodate the aforementioned hooks 252a, so that the main disc 252 may be engaged with the cone 210.

The main disc 252 has a receiving part 252b formed on the lower surface thereof so as to receive the mounting disc 251.

The lower surface of the mounting disc 251 is attached to the rear surface of a portable electronic device or to a case of such an electronic device. The mounting disc 251 is made of a thickness and a material that do not affect wireless charging of the electronic device. The mounting disc 251 has an area relatively smaller than that of the main disc 252 and is provided with locking blades 251a at regular intervals around the mounting disc 251.

When either the mounting disc 251 or the main disc 252 is rotated in place in a state, in which the mounting disc 251 is inserted into the receiving part 252b of the main disc 252, the mounting disc 251 and the main disc 252 are fastened by means of the plurality of locking blades 251.

The second cover 260 is coupled to the inverted cone 220 and covers the upper opening 221 of the inverted cone 220.

The second cover 260 may include a main disc 261 and a sub disc 262. The main disc 261 has an area corresponding to that of the upper opening 221 of the inverted cone 220. The main disc 261 and the inverted cone 220 may be combined in various ways, wherein as an example, as shown in the drawings, hooks 261a (at least two hooks are required) are formed on the lower surface of the main disc 261 and grooves 223 (at least two grooves are required) are formed on the inside of the inverted cone 220 so as to accommodate the aforementioned hooks 261a, so that the main disc 261 may be engaged with the inverted cone 220.

The sub disc 262 has an area relatively smaller than that of the main disc 261 and is detachably provided on upper surface of the main disc 261. The sub disc 262 has hooks 262a (at least two hooks are required) formed on the lower surface of the sub disc 262, and the main disc 261 has grooves 262b (at least two grooves are required) formed on the upper surface of the main disc 261 so as to accommodate the aforementioned hooks 262a, so that the sub disc 262 may be engaged with the main disc 261. Characters, advertisements, etc. may be displayed on the upper surface of the sub disc 262. In addition, the upper surface of the sub disc 262 may be a mirror.

The accessory 200 for an electronic device described above has a structure, in which the cone 210 and the inverted cone 220 are combined by means of the protrusion 222 of the cone 210, the ring plate 230 and the screw 235. Therefore, it is easy to assemble the cone 210 and the inverted cone 220, and the risk of separation of the cone 210 and the inverted cone 220 from each other is very low even after long-term use.

Various expression terms, visualized images, etc. used in the description of the embodiments of the present disclosure are merely selected for the purpose of improving the understanding of the technology.

In addition, the present disclosure has been described by way of a limited number of embodiments for the sake of convenience, and those of ordinary skill in the art would be able to devise new embodiments without departing from the technical spirit of the present invention based on the described content.

Accordingly, the claims of the present disclosure should not be limited by some of the expressions shown in the "description of the invention" and "drawings", but should be interpreted broadly based on the fundamental technical idea contained throughout the specification.

| Description of the Reference Numerals in the Drawings |
| --- |
| 100 accessory for an electronic device |
| 110 cone |
| 111 upper opening / 112 lower opening / 113 groove |
| 120 inverted cone |
| 121 upper opening |
| 122 protrusion / 122a neck part / 122b head part |
| 123 groove |
| 130 clamping ring |
| 131 break part |
| 140 neck cylinder |
| 150 first cover |
| 151 mounting disc / 151a locking blade |
| 152 main disc / 152a hook / 152b receiving part |
| 160 second cover |
| 161 main disc / 161a hook / 162b groove |
| 162 sub disc / 162a hook |
| 200 accessory for an electronic device |
| 210 cone |
| 211 upper opening |
| 212 lower opening |
| 213 groove |
| 220 inverted cone |
| 221 upper opening |
| 222 protrusion / 222a screw hole |
| 223 groove |
| 230 ring plate |
| 235 screw |
| 240 neck cylinder |
| 250 first cover |
| 251 mounting disc / 251a locking blade |
| 252 main disc / 252a hook / 252b receiving part |
| 260 second cover |
| 261 main disc / 261a hook / 262b groove |
| 262 sub disc / 162a hook |

What is claimed is:

1. An accessory for an electronic device, comprising:
a cone, which has an empty space therein, a wrinkle part formed on a body thereof so as to be folded in a telescopic manner, and an upper portion and a lower portion, which are open;
an inverted cone which has an empty space therein, a wrinkle part formed on a body thereof so as to be folded in a telescopic manner, an upper portion that is open, and a lower portion having a protrusion extending therefrom, the protrusion being composed of a neck part with a hollow center portion and a head part;
a clamping ring, which is positioned inside the cone and coupled to the neck part of the protrusion in a state in which the protrusion is inserted into an upper opening of the cone;
a neck cylinder, which surrounds the neck part of the protrusion and is in direct contact with a narrow upper portion of the cone and a narrow lower portion of the inverted cone as forcibly separating the two cones and forms and maintains a gap between them; and
a first cover for covering a lower opening of the cone, wherein the first cover includes:
a mounting disc, which has a plurality of locking blades provided at regular intervals along the circumference of the mounting disc, and has a lower surface to be attached to a portable electronic device; and
a main disc, which has a diameter corresponding to the diameter of the lower opening of the cone and has a receiving part formed on a lower surface thereof so as to accommodate the mounting disc, and wherein if the mounting disc is rotated in place while the mounting disk is inserted into the receiving part, the mounting disc and the main disc are fastened to each other by the plurality of locking blades.

2. The accessory for an electronic device according to claim 1, further comprising a second cover for covering an upper opening of the inverted cone, wherein the second cover includes:
   a main disc having a diameter corresponding to the diameter of the upper opening of the inverted cone; and
   a sub disc detachably attached to the upper surface of the main disc.

3. An accessory for an electronic device, comprising:
   a cone, which has an empty space therein, a wrinkle part formed on a body thereof so as to be folded in a telescopic manner, and an upper portion and a lower portion, which are open;
   an inverted cone, which has an empty space therein, a wrinkle part formed on a body thereof so as to be folded in a telescopic manner, an upper portion that is open, and a lower portion having a protrusion extending therefrom, the protrusion having a screw hole formed in the center of the bottom surface thereof;
   a ring plate having a diameter larger than that of an upper opening of the cone and added to the bottom surface of the protrusion while the protrusion is inserted into the upper opening of the cone;
   a screw for fixing the ring plate to a hollow center portion of the protrusion;
   a neck cylinder, which surrounds the neck part of the protrusion and is in direct contact with a narrow upper portion of the cone and a narrow lower portion of the inverted cone as forcibly separating the two cones and forms and maintains a gap between them; and
   a first cover for covering a lower opening of the cone, wherein the first cover includes:
   a mounting disc, which has a plurality of locking blades provided at regular intervals along the circumference of the mounting disc, and has a lower surface to be attached to a portable electronic device; and
   a main disc, which has a diameter corresponding to the diameter of the lower opening of the cone and has a receiving part formed on a lower surface thereof so as to accommodate the mounting disc, and
   wherein if the mounting disc is rotated in place while the mounting disk is inserted into the receiving part, the mounting disc and the main disc are fastened to each other by the plurality of locking blades.

4. The accessory for an electronic device according to claim 3, further comprising a second cover for covering an upper opening of the inverted cone, wherein the second cover includes:
   a main disc having a diameter corresponding to the diameter of the upper opening of the inverted cone; and
   a sub disc detachably attached to the upper surface of the main disc.

* * * * *